(12) United States Patent
Mbog et al.

(10) Patent No.: US 8,584,339 B2
(45) Date of Patent: Nov. 19, 2013

(54) METHOD FOR FASTENING A COMPONENT INSIDE A FUEL TANK

(75) Inventors: Edouard Mbog, Saint Brice sous foret (FR); Franck Lecrivain, Fresnoy la rivere (FR)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 342 days.

(21) Appl. No.: 12/936,636

(22) PCT Filed: Apr. 9, 2009

(86) PCT No.: PCT/EP2009/054333
§ 371 (c)(1),
(2), (4) Date: Oct. 6, 2010

(87) PCT Pub. No.: WO2009/125008
PCT Pub. Date: Oct. 15, 2009

(65) Prior Publication Data
US 2011/0035928 A1 Feb. 17, 2011

(30) Foreign Application Priority Data

Apr. 10, 2008 (FR) ...................................... 08 52405

(51) Int. Cl.
| | |
|---|---|
| *B23Q 16/00* | (2006.01) |
| *B23P 11/00* | (2006.01) |
| *B23P 19/00* | (2006.01) |
| *B23P 13/04* | (2006.01) |
| *B62D 33/00* | (2006.01) |
| *B29C 45/14* | (2006.01) |
| *B32B 37/00* | (2006.01) |

(52) U.S. Cl.
USPC ...... 29/464; 29/525.01; 29/525.14; 29/527.1; 264/512; 264/515; 264/516; 264/523; 264/540; 220/562; 220/563; 220/564

(58) Field of Classification Search
USPC ............... 29/525.01, 525.14, 527.1; 220/563, 220/564; 264/512, 515, 516, 523, 540
See application file for complete search history.

(56) References Cited

U.S. PATENT DOCUMENTS

| | | | | |
|---|---|---|---|---|
| 4,651,701 | A | | 3/1987 | Weaver |
| 4,694,857 | A | * | 9/1987 | Harris ...................... 137/565.24 |

(Continued)

FOREIGN PATENT DOCUMENTS

| | | |
|---|---|---|
| DE | 102005054179 A1 | 5/2006 |
| EP | 0976600 A2 | 2/2000 |

(Continued)

OTHER PUBLICATIONS

Office Action issued May 21, 2013 in Japanese Patent Application No. 2011-503456 submitting English translation only.

(Continued)

*Primary Examiner* — Essama Omgba
*Assistant Examiner* — Darrell C Ford
(74) *Attorney, Agent, or Firm* — Oblon, Spivak, McClelland, Maier & Neustadt, L.L.P.

(57) ABSTRACT

A method for fastening a component to a lower internal wall of a fuel tank includes providing the tank with a fastening point close to the opening of the tank and located on an upper internal wall of the tank, and with one or more reliefs. The method also includes inserting the component into the tank via the opening, and the component is positioned on the lower internal wall with the aid of the one or more reliefs, and creating a mechanical connection between the fastening point and the component with the aid of a support. A fastening ring or disc is welded to the upper internal wall of the tank and is provided with one or more reliefs that enable the rapid and detachable fastening of a part provided with one or more complementary reliefs.

9 Claims, 6 Drawing Sheets

(56) References Cited

U.S. PATENT DOCUMENTS

| | | | |
|---|---|---|---|
| 4,716,931 A | 1/1988 | Shibamoto | |
| 4,790,185 A * | 12/1988 | Fedelem et al. | 73/317 |
| 5,040,516 A * | 8/1991 | Haraguchi | 123/509 |
| 5,044,526 A * | 9/1991 | Sasaki et al. | 222/377 |
| 5,165,867 A | 11/1992 | Dockery | |
| 5,738,380 A * | 4/1998 | Zipser et al. | 280/834 |
| 5,931,353 A | 8/1999 | Guyomard et al. | |
| 5,979,485 A * | 11/1999 | Tuckey et al. | 137/143 |
| 6,000,913 A * | 12/1999 | Chung et al. | 417/53 |
| 6,176,260 B1 | 1/2001 | Hahner et al. | |
| 6,298,540 B1 * | 10/2001 | Benjey et al. | 29/452 |
| 6,471,072 B1 * | 10/2002 | Rickle et al. | 210/486 |
| 6,655,364 B1 * | 12/2003 | Yoshioka | 123/509 |
| 6,854,451 B2 * | 2/2005 | Ebihara et al. | 123/509 |
| 6,966,306 B2 * | 11/2005 | Sawert et al. | 123/509 |
| 7,523,745 B2 * | 4/2009 | Troxler et al. | 123/509 |
| 7,571,716 B2 * | 8/2009 | Tipton et al. | 123/509 |
| 8,365,942 B2 * | 2/2013 | Nakajima et al. | 220/563 |
| 8,377,368 B2 * | 2/2013 | Grauer | 264/516 |
| 2002/0043533 A1 | 4/2002 | Gombert et al. | |
| 2002/0063129 A1 * | 5/2002 | Potter et al. | 220/4.13 |
| 2004/0124567 A1 * | 7/2004 | Stangier | 264/523 |
| 2005/0284220 A1 * | 12/2005 | Cotton et al. | 73/322.5 |
| 2006/0032538 A1 | 2/2006 | Park | |
| 2006/0102634 A1 | 5/2006 | Potter et al. | |
| 2006/0225501 A1 * | 10/2006 | Bahl et al. | 73/313 |
| 2007/0113832 A1 | 5/2007 | Kimura et al. | |
| 2007/0290414 A1 * | 12/2007 | Criel | 264/531 |
| 2009/0127265 A1 * | 5/2009 | Magnusson et al. | 220/564 |
| 2011/0024952 A1 * | 2/2011 | Stoiber et al. | 264/523 |
| 2011/0139128 A1 * | 6/2011 | Zhang et al. | 123/509 |
| 2013/0134171 A1 * | 5/2013 | Isayama et al. | 220/562 |
| 2013/0146604 A1 * | 6/2013 | Moreno et al. | 220/562 |

FOREIGN PATENT DOCUMENTS

| | | |
|---|---|---|
| EP | 1787900 A1 | 5/2007 |
| GB | 2404175 A | 1/2005 |
| JP | 3-135832 A | 6/1991 |
| JP | 2006-9729 A | 1/2006 |
| JP | 20060029265 A | 2/2006 |
| JP | 20060051933 A | 2/2006 |
| WO | WO 2007000454 A1 | 1/2007 |
| WO | WO 2007026011 A1 | 3/2007 |

OTHER PUBLICATIONS

Combined Office Action and Search Report issued Jan. 15, 2013 in Chinese Application No. 200980116773.3 (With English Translation).

* cited by examiner

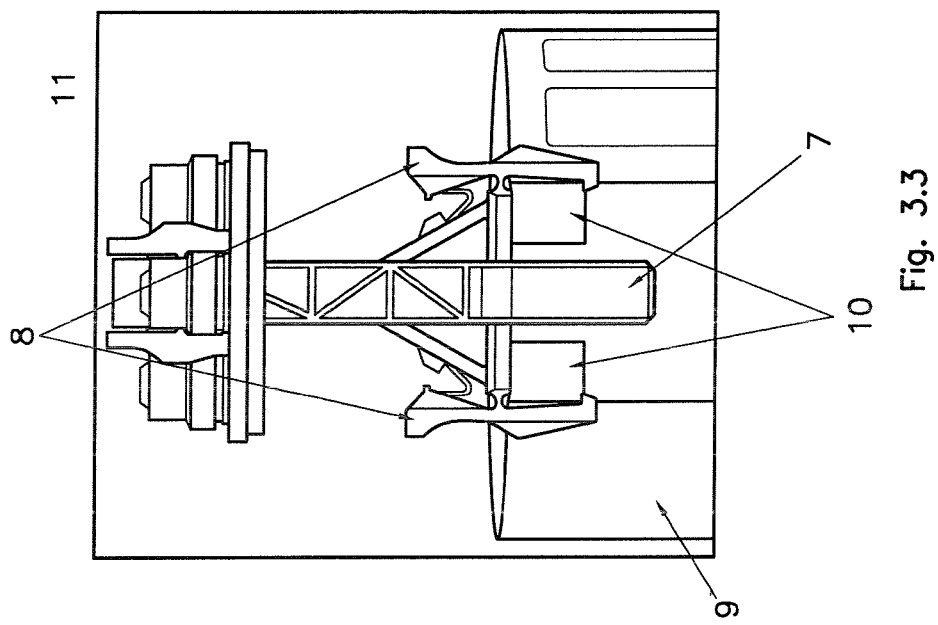
Fig. 3
Fig. 3.1      Fig. 3.3
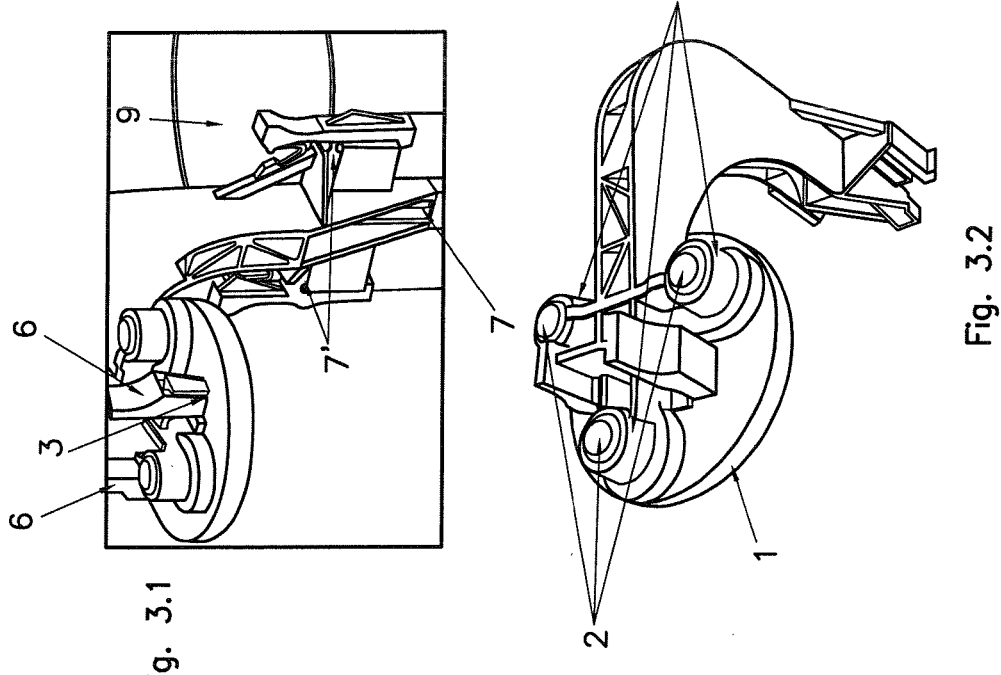
Fig. 3.2

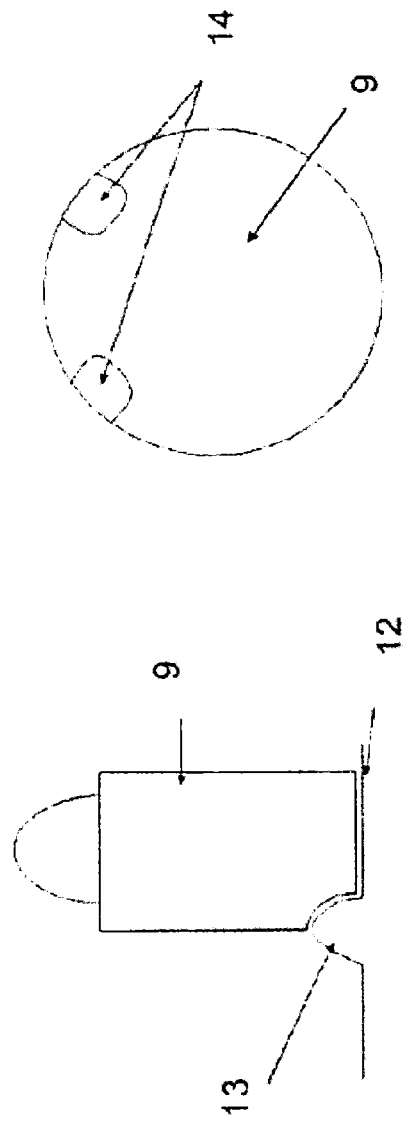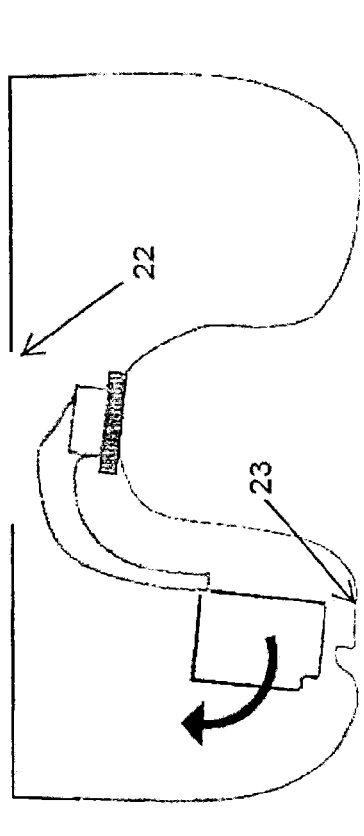
Fig. 4.1
Fig. 4.2
Fig. 4.3
Fig. 4

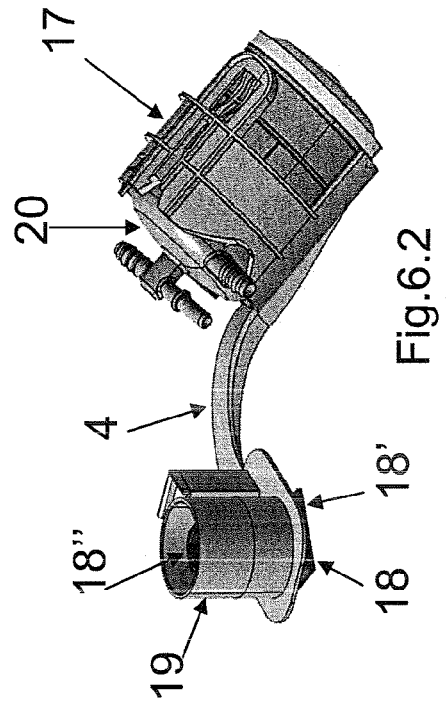
Fig.6.1
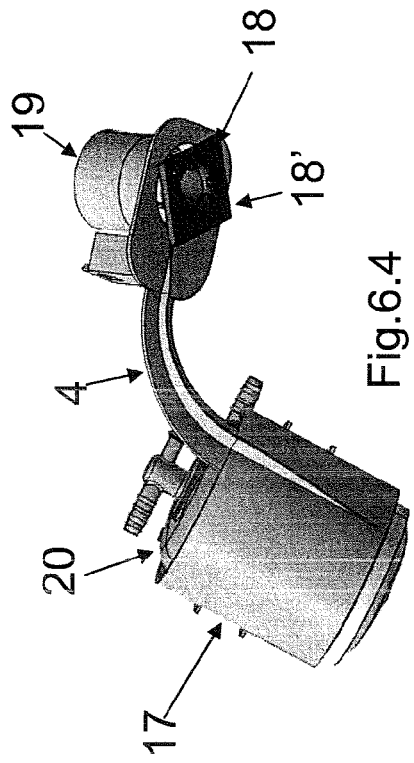
Fig.6.2
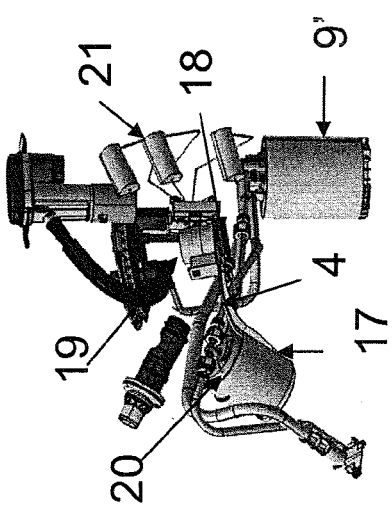
Fig.6.3
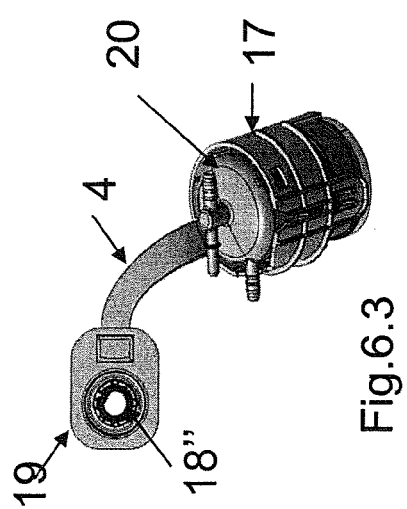
Fig.6.4
Fig. 6

METHOD FOR FASTENING A COMPONENT INSIDE A FUEL TANK

CROSS-REFERENCE TO RELATED APPLICATIONS

This application is a U.S. national stage application under 35 U.S.C. §371 of International Application No. PCT/EP2009/054333 filed Apr. 9, 2009, which claims priority to French Patent Application No. 08.52405 filed Apr. 10, 2008, the whole content of this application being incorporated herein by reference for all purposes.

TECHNICAL FIELD OF THE INVENTION

The invention relates to a method for fastening a component inside a fuel tank. It relates more especially to a method for fastening components in a zone distant from the mounting plate that seals the service opening, and this being in an easy and reliable manner. It is especially advantageous for fastening the pump/gauge module inside multi-compartment tanks.

BACKGROUND OF THE INVENTION

In heat engine vehicles, in particular in motor vehicles, the fuel system includes at the present time, apart from the tank for storing the fuel, a number of accessories. Among these accessories are, inter alia, valves, filters, pumps, gauges and pressure regulators, which are accessories inside the tank.

The current tendency is to integrate several of these components into a single module which is fastened inside the fuel tank (FT), generally by insertion through an opening provided for this purpose (and normally (during operation) sealed by a mounting plate) and then, by fastening with the aid of suitable means, which are preferably reversible so that said module can be removed for maintenance, repair, etc.

Thus, U.S. Pat. No. 5,931,353 in the name of the Applicant describes a tank provided with reliefs (slides) molded as one part with the wall of the tank and into which the module can be inserted and held owing to complementary reliefs provided on its lateral surface (flexible protuberances). However, the geometry of these reliefs is such that if the relative bulkiness of the module with respect to the cavity into which it must be inserted is large and/or if the fastening location is distant from the insertion opening, the module cannot in fact be fastened in practice. Moreover, such a fastening system is too readily reversible so that the pump may in fact be detached during handling of the tanks and/or when they are fastened to a vehicle.

U.S. Pat. No. 4,716,931 proposes a fastening system for an FT pump/gauge that makes it possible to solve the problem of remote fastening owing to the use of a support which is fastened to a relief close to the insertion opening and into which the pump/gauge is inserted. However, with such a system, not all the movements of the pump/gauge are stopped since, on the one hand, the end of the support where the pump/gauge is fastened is free and since, on the other hand, this component is simply inserted into a relief (ring) of the support and is not fastened to it.

U.S. Pat. No. 5,040,516 proposes a system for fastening components inside multi-compartment tanks (or saddle-shaped tanks, "saddle tanks" in the jargon of the field) which also uses a support fastened close to the insertion opening. This support comprises hollow reliefs into which arms serving as an extension to the accessories are inserted. Such a system also does not make it possible to stop all the movements of the components since the end of the arms where the components are fastened is free.

SUMMARY OF THE INVENTION

The object of the present invention is hence to provide a method that makes it possible to fasten (preferably in a detachable manner, i.e. with reversible fastening means (that can be locked/released)) a component to the lower internal wall of an FT at a location distant from the insertion opening, and this in both an easy and reliable manner, i.e. it makes it possible to flatten the component against the bottom of the tank and to hold it in the location where it must be fastened and in the correct angular position.

This method consists in providing the tank with a fastening point close to the insertion opening and with one or more reliefs at the location where the component must be fastened inside the tank, in inserting the component inside the tank via the opening and in positioning it on the lower wall of the tank with the aid of the relief; and finally: in mechanically connecting the fastening point and the component with the aid of a support.

BRIEF DESCRIPTION OF THE DRAWINGS

For a detailed description of the preferred embodiments of the invention, reference will now be made to the accompanying drawings in which:

FIG. 3 illustrates, in detail (via three separate views in FIGS. 3.1, 3.2, 3.3), a way in which the three parts can be connected;

FIG. 4 schematically illustrates via three separate views in FIGS. 4.1, 4.2, 4.3, the positioning reliefs respectively on the wall of the tank and on the pot, which are not visible in the other figures;

FIG. 6 illustrates, via four separate views: FIGS. 6.1, 6.2, 6.3, and 6.4, a filter housing with a fastening arm.

DETAILED DESCRIPTION OF PREFERRED EMBODIMENTS

Figure 1:
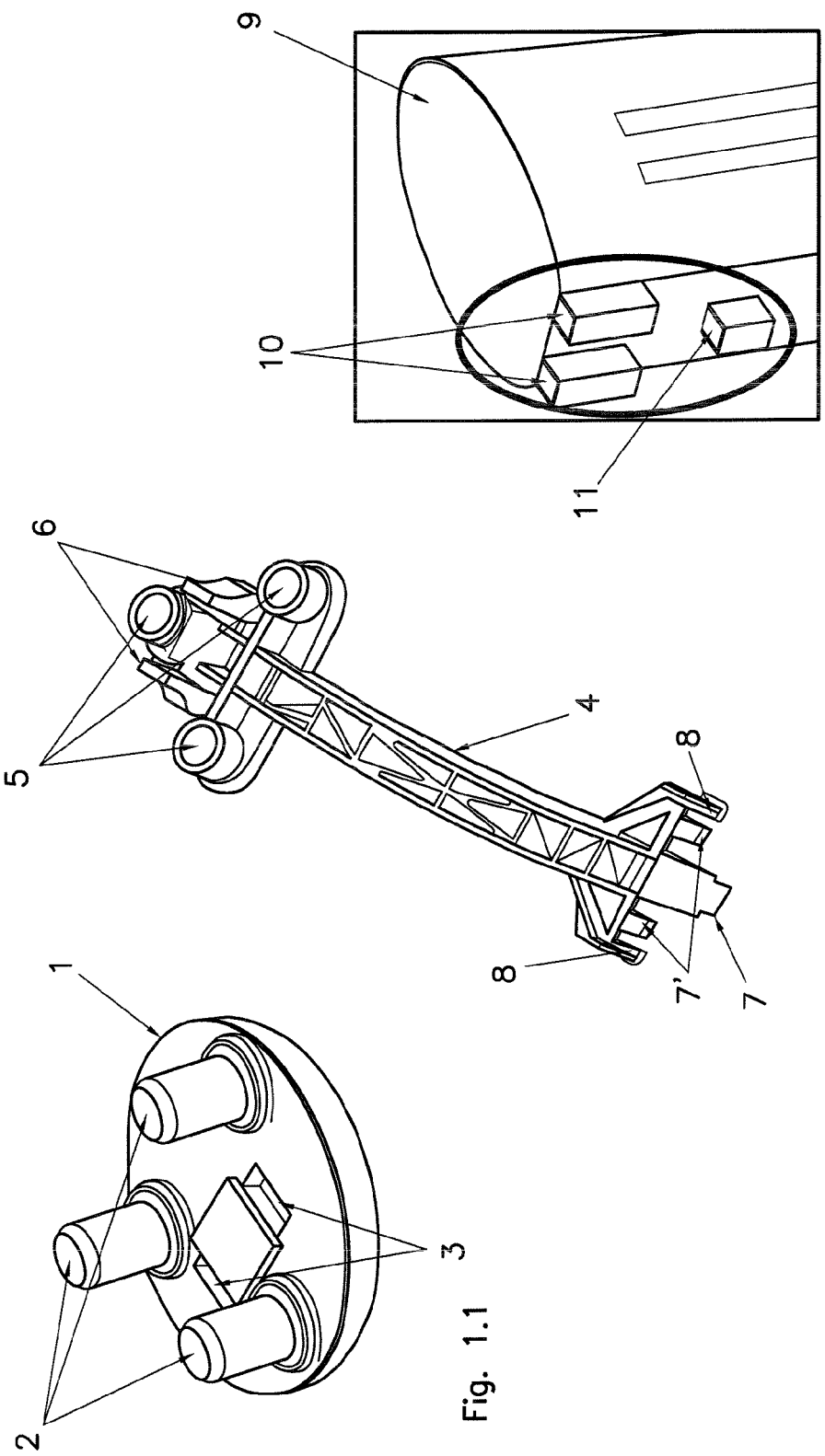
FIG. 1 shows separately three parts intended to be mechanically connected and that are constituted by a fastening ring (FIG. 1.1), a fastening arm (FIG. 1.2) and a pot (FIG. 1.3) intended to receive a pump/gauge module.

In the context of the invention, the term "fuel" is understood to mean a hydrocarbon suitable for supplying (internal combustion) heat engines. The FT to which the invention applies is suitable either for heat engines supplied with volatile liquid fuels or for engines supplied with heavy liquid fuels (diesel). It is generally intended to be incorporated into a motor vehicle (car, lorry, motorcycle, river boat, ocean-going vessel or aeroplane for example). It may have any shape, even a complicated, for example multi-compartment or saddle, shape (which is often the case in practice considering the presence of other objects in its vicinity on the vehicle).

According to the invention, this tank is based on a material that is compatible with each of the liquid hydrocarbons that it is capable of handling. This material must be chemically inert both with respect to volatile liquid hydrocarbons (petrol) and heavy liquid hydrocarbons (diesel) at the customary operating pressures and temperatures. It may be a plastic or a metal.

Thermoplastics give good results within the context of the invention, especially due to the advantages of weight, mechanical strength and chemical resistance and easier processing (which justifiably makes it possible to obtain complex shapes).

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, in a non-limiting manner: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, polyvinyl halides, thermoplastic polyesters, polyketones, polyamides and copolymers thereof. A blend of polymers or copolymers may also be used; similarly it is also possible to use a blend of polymeric materials with inorganic, organic and/or natural fillers such as, for example but in a non-limiting manner: carbon, salts and other inorganic derivatives, natural fibres, glass fibres and polymeric fibres. It is also possible to use multilayer structures composed of stacked and joined layers comprising at least one of the polymers or copolymers described above.

Polyvinyl halides and polyolefins are generally preferred. One polymer often employed is polyethylene. Excellent results have been obtained with high-density polyethylene (HDPE). In a known manner, the impermeability of this plastic to volatile hydrocarbons may be improved by surface treatment (fluorination, sulfonation, etc.) and/or by the use of a barrier layer (for example based on polyamide (PA) or on a polyvinyl alcohol [homopolymer (PVOH) or ethylene/vinyl alcohol copolymer (EVOH)].

Preferably, the tank is a multilayer structure that includes at least one layer based on HDPE and at least one layer based on EVOH (the expression "based on" meaning "mainly composed of", it being understood that these layers may comprise other polymers and/or additives in a minor amount (by weight)). The component to which the method according to the invention applies may also comprise at least one part made of plastic (HDPE).

The component to be fastened inside the FT according to the invention may be any component generally intended for supplying the engine with fuel, for monitoring the fuel level in the tank, for ventilating the tank, etc. The present invention applies most particularly well to the fuel filter and in particular to a filter housing that includes the fuel filter. The invention applies also most particularly well to the pump and in particular to a module that includes, besides the pump, at least one component chosen from a fuel filter, a gauge, and a pressure regulator (that makes it possible to supply the engine with fuel at a desired pressure). It should be noted that this module may also incorporate other accessories such as gates and valves (for example a non-return valve and/or a valve for preventing overfilling). Most particularly preferably, such a module includes what is known as a swirl pot in which the pump is held and draws fuel in order to supply an engine therewith.

According to the invention, the tank comprises an opening through which certain components may be inserted and which is generally (i.e. by default, when the tank is in service) sealed (i.e. closed in a leaktight manner) and this generally being with the aid of a mounting plate (type of substantially flat cover) which may or may not bear certain accessories (valves, electrical or fluid connections to the outside, etc.). This opening may have been produced at the same time as the tank was manufactured (which generally takes place by blow molding or thermoforming in a mold) or have been machined subsequently in the wall of this tank.

According to the invention, the tank is provided with a fastening point close to the insertion opening, i.e. at a distance that allows an easy manual or automated fastening of an object. This point may simply consist of one portion of the wall that is free/available for fastening by welding, bonding, mechanical fastening (rivets, bolts, etc.) and which may or may not be in relief with the neighbouring wall. Alternatively and preferably, it may be a specific object (type of fastening connection) which is attached to this wall (e.g. by welding, bonding, etc.). This object may have any shape; it is preferably substantially flat and/or circular. A fastening ring or disc welded to the internal wall of the tank gives good results. This object may also consist of a base and a fixation element attached to or in one piece with the base. Preferably, this part is provided with relief(s) that enable a rapid and detachable fastening of a part provided with complementary relief(s) which is attached to or as a single piece with the support serving as the rigid fastening. In a particular embodiment, the object may be a spin clip comprising a base and a fixation clip. In this embodiment, the relief(s) is represented by the fixation clip that is aimed to cooperate with a complementary clip on the support.

The fastening point described above is by definition located on the wall of the tank, generally on its internal wall. In particular, when the tank is a saddle tank comprising at least two compartments and a reduced volume that connects these compartments, this point is preferably located in this volume and in particular, on its lower wall. Indeed, in such a tank, the service opening is generally in the vicinity of or even in this volume also.

When the component is a "pump" module, it may be advantageous to fasten it inside a compartment of the tank, the shape and capacity of which are such that said compartment acts as a (main or auxiliary) swirl pot for the pump. The molding of a swirl pot as a single piece with the wall of the tank is described in Application WO 2007/026011 in the name of the Applicant, the content of which is, for this purpose, incorporated by reference in the present application. It should be noted that this variant is also advantageous independently of the present invention, whatever the method of fastening the pump.

By definition, the relief(s) (used in the singular later on for simplicity) make(s) it possible to place the component at the desired location on the lower wall of the tank and in the desired angular position. It therefore makes it possible to hold the component in place on the bottom of the tank in order to facilitate the assembly operations. Conversely, it does not generally make it possible to prevent the vertical movements thereof so that the insertion and removal of the component into/from this relief are particularly easy. Protuberances (preferably at least two in number) of substantially conical shape, molded in the tank and complementary to hollow reliefs that are also conical present in the component (or at least: its outer envelope) are particularly suitable for ensuring correct positioning of said component. In this case, the positioning takes place up to a stop and a portion of the movement for positioning over these reliefs may consist of a sliding over the lower wall of the tank. This variant with conical reliefs is also advantageous since it makes it possible to prevent the rotation of the arm around the fastening point (movement which may be induced following deformation of the location where the fastening point is; this phenomenon is illustrated in FIG. 4.3 appended to the present application).

When the tank is made of plastic, it is generally obtained by molding in a mold. Hence, advantageously, either the relief described above is molded as a single piece with the wall of the tank (for example, by using moveable parts in the mold as described in the aforementioned U.S. Pat. No. 5,931,353 in the name of the Applicant, the content of which is, for this purpose, incorporated by reference in the present application), or it consists of a specific part that is fastened to the wall of the tank at the same time that the tank is manufactured. The same observation in fact applies to the fastening point. The first alternative is preferred for the relief, whilst the second is preferred for the fastening point.

According to one preferred variant of the invention, the tank is molded from an extruded cylindrical parison, cut into two sheets that are molded and assembled in a mold comprising cavities and a core, said process comprising the following steps
1. the parison is introduced into the mold cavities;
2. the core is introduced inside the parison;
3. the mold is closed so that the cavities come into leaktight contact with the core;
4. the parison is pressed against the cavities by blowing through the core and/or applying a vacuum behind the cavities;
5. the fastening point and/or the relief(s) are fastened to or molded into the parison;
6. the mold is opened to withdraw the core;
7. the final molding of the parison is carried out by blow molding (by injecting a pressurized fluid inside the parison) and/or thermoforming (by applying a vacuum behind the cavities).

Such a process is described in Application WO 2007/000454 also in the name of the Applicant, the content of which is, for this purpose, also incorporated by reference in the present application.

According to the invention, a mechanical connection is created between the fastening point and the component with the aid of a support. This is understood to mean that use is made of a specific part, generally of elongated shape (the length of which is sufficient to connect the fastening point and the component, which may be positioned at locations at least a few centimetres, or even tens of centimetres apart in the tank, which is often the case in practice and in particular with saddle tanks) to limit the relative movements of the component with respect to the fastening point. This is therefore a type of rigid arm which is either attached to (or even is one piece with) the component, or is a separate part, one end of which is (preferably detachably) fastened to the component once this component is stopped by the relief(s). The second variant is preferred. Likewise, the "free" end of this arm (once it is) attached to the component is preferably also detachably fastened to the fastening point.

According to one advantageous variant of the invention, at least one flexible portion (preferably, a spring) is integrated into the support and/or located between the support and the component. Its purpose is to press the component against the bottom of the tank whatever the case in question (taking into account manufacturing tolerances, deformation of the FT, etc.). Preferably, it is a spring that is relatively short and/or that has a high return force so as to ensure correct fastening of the component.

One detachable fastening means that is particularly suitable within the context of the invention consists in providing the support with clips that can be inserted into or grip corresponding reliefs on the fastening point and/or on the component. Alternatively to or in addition to these clips, the support and respectively the fastening point and/or the component may comprise complementary reliefs (protuberances and hollows respectively) that generally make it possible to insert a portion of one part inside another part.

The aforementioned fastening(s) may be carried out manually by an operator, but preferably they are performed by a robot.

The present invention is illustrated, in a non-limiting manner, by FIGS. 1 to 6, which constitute schematic diagrams of certain preferred variants of the invention.

Figure 2:
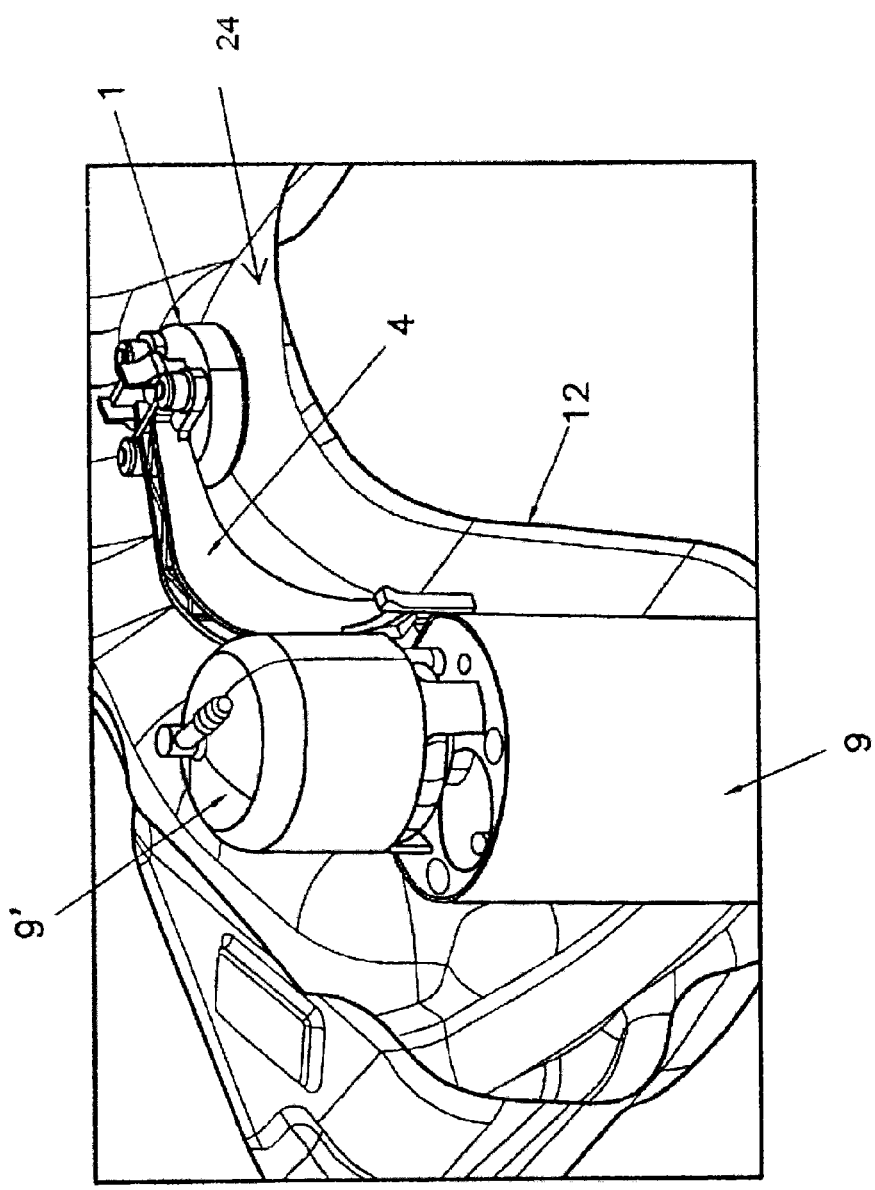
FIG. 2 shows these three parts connected together and fastened inside a fuel tank.
Figure 5:
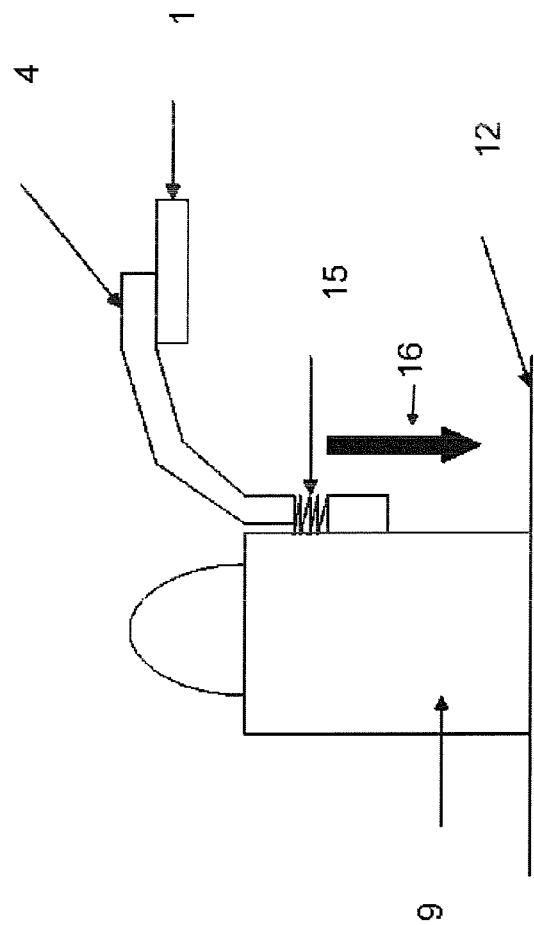
FIG. 5 illustrates how to make the fastening between the pot and the tank flexible.

Thus, FIG. 1 shows, separately, 3 parts intended to be mechanically connected and that are constituted by a fastening ring, a fastening arm and a pot intended to receive a pump/gauge module. FIG. 2 shows these 3 parts connected together and fastened inside an FT. FIG. 3 illustrates, in detail (via 3 views), a way in which the 3 parts can be connected. FIG. 4 schematically illustrates the positioning reliefs respectively on the wall of the tank and on the pot, which are not visible in the other figures. FIG. 5 illustrates how to make the fastening between the pot and the tank flexible. Finally, FIG. 6 illustrates, via 4 views, a filter housing with a fastening arm.

FIG. 1.1 shows a fastening ring (1) intended to be fastened (preferably by welding) to the internal wall of a saddle tank, this being in a reduced volume that connects the compartments of this saddle tank (see FIG. 2). This "welded" ring (1) comprises protuberances (2) and cavities (3) intended to cooperate respectively with hollows (5) and clips (6) of the fastening arm (4) illustrated in FIG. 1.2. This arm (4) also comprises clips (8) intended to grip a corresponding relief (10) on a pot (9) of a pump illustrated in FIG. 1.3, and also reliefs (7, 7') intended to cooperate with corresponding reliefs (11, 10) on the pot (9).

FIG. 2 shows how this pot (9), comprising a pump (9'), is fastened inside a saddle FT (12) with the aid of the arm (4) and the ring (1), the latter being welded to the upper internal wall (24) of the tank (12) in a portion of it that connects 2 of its compartments (for which only a truncated view of the compartment containing the pump (9') is illustrated).

In FIG. 3, it is possible to see in greater detail in FIGS. 3.1, 3.2, and 3.3, how the various reliefs described above in support of the preceding figures cooperate when the arm (4) fastens the pot (9) inside the tank (12).

FIG. 4 schematically illustrates how conical reliefs (13) molded as a single piece with the wall of the tank cooperate with corresponding reliefs or conical hollows (14) present in the lower portion of the pot (9), one view of which is illustrated in FIG. 4.2. The purpose of these conical reliefs is not only to position the module before it is fastened but also to prevent the rotation of the arm around the fastening point, which movement may be induced following deformation of the location where the fastening point is found, as illustrated in FIG. 4.3.

The fastening of the assembly illustrated in FIG. 2 took place as follows:
  the pot (9) equipped with the pump (9') is inserted into the tank via an opening (22) and it is positioned on the lower internal wall (23) with the aid of reliefs (13, 14) as illustrated in FIG. 4;
  the arm (4) is inserted through the same opening and is fastened first to the pot (9) with the aid of clips (8) and reliefs (7, 7') which respectively grip the reliefs (10) and are inserted into the reliefs (10, 11) as illustrated in FIG. 3;
  finally, the other end of the arm is fastened to the ring (1) which has been pre-welded to the wall of the tank, this fastening being via the clips (6) and the reliefs 5 which respectively cooperate with the reliefs (2) and (3) of the ring (1) (as illustrated in FIG. 3 also).

FIG. 5 schematically shows how the fastening between the arm (4) and the pot (9) may be made flexible: it suffices to insert a spring (15) between the arm (4) and the pot (9), this spring (15) being compressed and exerting a force on the pot (9) in the direction of the arrow (16), which therefore presses the pot against the wall of the tank (12).

FIG. 6 shows a filter housing (17) for supporting a filter (20) and comprising a fastening arm (4) in one piece with the filter housing (17).

In particular, FIG. 6.1 illustrates a global view representing the assembly filter housing (17)/filter (20)/fastening arm (4), a pump (9'), a level gauge (21) and other pipes.

The fastening arm (4) comprises, at one extremity opposite to the filter housing (17), a fixation element (19) in the form of a hollow cylinder. The fixation element (19) is aimed to cooperate with a fastening point that consists of a spin clip (18) that is intended to be fastened (preferably by welding) to the internal wall of a saddle tank. The spin clip (18) comprises a base (18') and a fixation clip (18") that is substantially orthogonal to the base (18') and cooperates with the fixation element (19) (as visible on FIG. 6.3 (a top view of the assembly filter housing/filter/spin clip)).

The fastening of the assembly illustrated in FIG. 6 took place as follows:
- the filter housing equipped with the filter (20) is inserted into the tank via an opening (not represented);
- the fixation element (19) is fastened to the fixation clip (18") of the spin clip (18) (which has been pre-welded to the wall of the tank) by inserting the fixation clip (18") inside the fixation element (19) and by rotating the fixation element (19) (and the filter housing (17) attached to it via the arm (4)) in such a manner as the fixation element (19) cooperates with the fixation clip (18");
- finally, the filter housing (17) is positioned on the wall with the aid of reliefs (not illustrated).

The invention claimed is:

1. A method for fastening a component to a lower internal wall of a fuel tank comprising an opening, comprising:
   providing the tank with a fastening point close to the opening and located on an upper internal wall of the tank, and with one or more reliefs that make it possible to position the component at a location where the component must be fastened;
   inserting the component into the tank via the opening, and the component is positioned on the lower internal wall with the aid of the one or more reliefs; and
   creating a mechanical connection between the fastening point and the component with the aid of a support,
   wherein a fastening ring or disc is welded to the upper internal wall of the tank and is provided with one or more reliefs that enable the rapid and detachable fastening of a part provided with one or more complementary reliefs attached to or as a single piece with the support.

2. The method according to claim 1, wherein the component consists of a module that includes at least one component selected from the group consisting of a pump, a fuel filter, a gauge, and a pressure regulator.

3. The method according to claim 1, wherein the tank is a saddle tank comprising at least two compartments and a reduced volume that connects the compartments, and wherein the fastening point is located on the upper internal wall of the volume.

4. The method according to claim 3, wherein the component comprises a pump, and wherein one compartment has a shape and a capacity such that it acts as a swirl pot for the pump.

5. The method according to claim 1, wherein the tank is obtained by molding a plastic, and wherein the one or more reliefs, or the fastening point, or combinations thereof are molded as a single piece with the upper internal wall of the tank during molding.

6. The method according to claim 5, wherein the tank is molded from an extruded cylindrical parison, cut into two sheets that are molded and assembled in a mold comprising cavities and a core, said molding comprising the following steps:
   1. the parison is introduced into the mold cavities;
   2. the core is introduced inside the parison;
   3. the mold is closed so that the cavities come into leaktight contact with the core;
   4. the parison is pressed against the cavities by blowing through the core and/or applying a vacuum behind the cavities;
   5. the fastening point and/or the one or more reliefs are fastened to or molded into the parison;
   6. the mold is opened to withdraw the core; and
   7. the final molding of the parison is carried out by blow molding and/or thermoforming.

7. The method according to claim 1, wherein the support is in the form of a rigid arm, a first end of the rigid arm being detachably fastened to the component once this the component is positioned by the one or more reliefs.

8. The method according to claim 7, wherein the rigid arm includes a second end which is not attached to the component and which is detachably fastened to the fastening point.

9. The method according to claim 1, wherein the tank is obtained by molding a plastic, and wherein the one or more reliefs, or the fastening point, or combinations thereof consist of a specific part that is fastened to the upper internal wall of the tank during molding.

* * * * *